June 2, 1970  E. A. GUZEWICZ  3,515,352
ROCKET NOZZLE
Original Filed Nov. 26, 1965
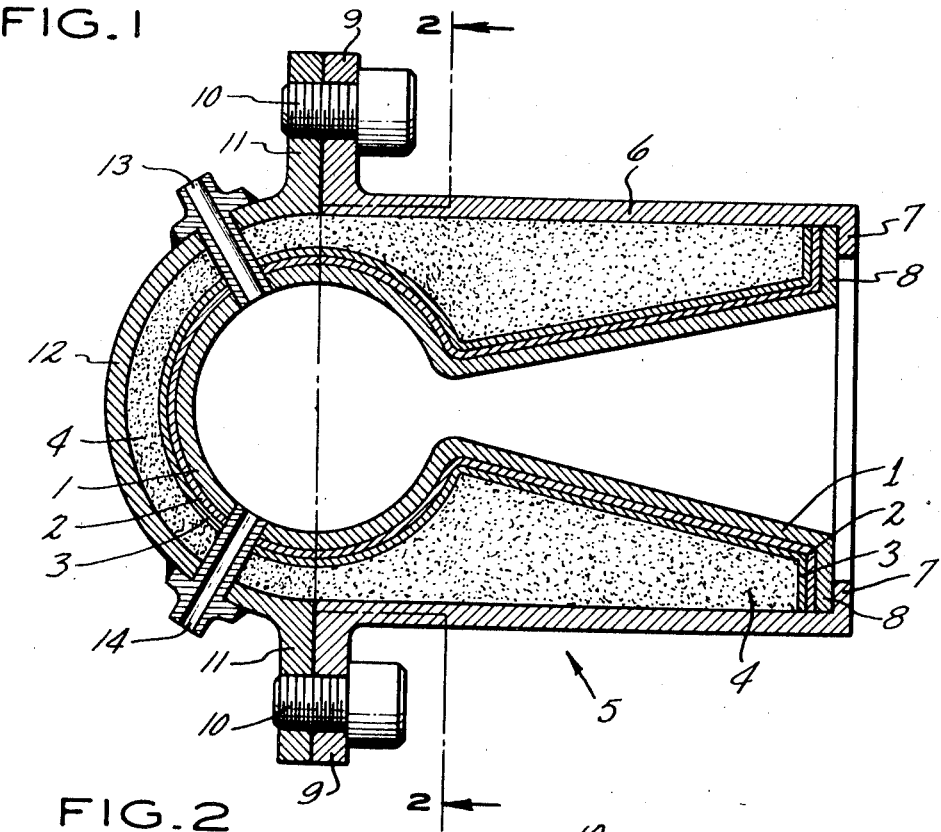
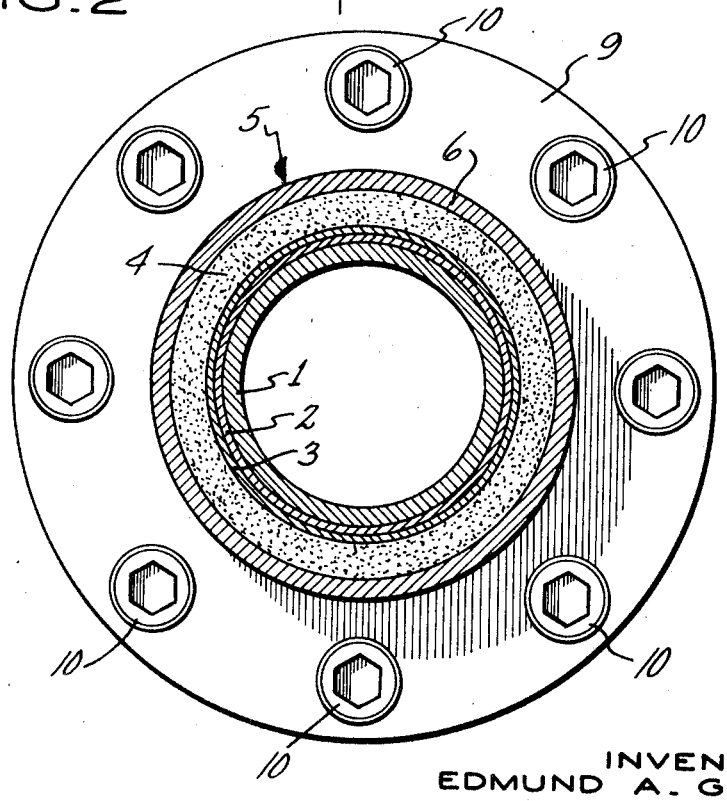
INVENTOR
EDMUND A. GUZEWICZ
BY Radford W. Luther
ATTORNEY

United States Patent Office 3,515,352
Patented June 2, 1970

1

3,515,352
ROCKET NOZZLE
Edmund A. Guzewicz, Wallingford, Conn., assignor to Chandler Evans Inc., West Hartford, Conn., a corporation of Delaware
Application Nov. 26, 1965, Ser. No. 513,651, now Patent No. 3,427,698, dated Feb. 18, 1969, which is a continuation-in-part of application Ser. No. 183,537, Mar. 29, 1962. Divided and this application Feb. 27, 1968, Ser. No. 729,844
Int. Cl. B64d 33/04
U.S. Cl. 239—265.15            2 Claims

ABSTRACT OF THE DISCLOSURE

A rocket nozzle of monolithic construction comprising a plurality of layers of a mixture of the refractory metal tungsten and the refractory insulating material zirconia, in which the innermost layer is 100% metal and the outermost layer is 100% refractory material. The plurality of layers of brittle refractory materials comprising the monolithic rocket nozzle are locked in place by an encapsulating steel shell.

---

This is a division of application Ser. No. 513,651, filed Nov. 26, 1965, now Pat. No. 3,427,698, of Feb. 18, 1969.

This application is a continuation-in-part of my copending application Ser. No. 183,537, filed Mar. 29, 1962.

This invention pertains to the jet nozzles of rocket motors, and more particularly has reference to the construction of such nozzles as monolithic structures of refractory materials which are highly resistant to elevated temperatures and the erosive and oxidizing effects of the gases that compose the propulsion jets.

For optimum rocket propulsion efficiency rocket motors must operate at or near stoichiometric fuel/oxidizer ratios which result in high temperatures, ranging from 5000° F. to 6500° F. To build rocket nozzles capable of withstanding these temperatures and the erosive effect of high velocity jet gases is a basic problem whose solution has been long sought in the art.

Heretofore, prior art designs have generally been of segmented construction, where high-temperature resistant refractory inserts are retained in critical locations by ablative cooled composites. This type of construction leaves seams in the surface where the segments meet and these seams are conductive to severe erosion from the high temperature and velocity of the jet gases. Also, ablative cooled composites char and change dimensionally, as well as have a tendency to reduce the enthalpy of the combustion gases, thus reducing the overall propulsion efficiency.

My invention solves the temperature and erosion problem by utilizing refractory material (e.g., tungsten) whose melting point is above that of the combustion temperature, and then using additional refractory material (e.g., zirconia) of low thermal diffusivity and conductance, to minimize the transient and steady-state temperature at the outside surface of the nozzle. This technique thus permits the use of a conventional steel casing with which to transmit the reaction thrust to the vehicle being propelled.

My invention comprises the use of a monolithic tungsten liner for the rocket chamber, throat and nozzle, with no segments or seams. The tungsten liner is externally overlaid by heat-insulating material having a low thermal conductivity so that a minimum of heat is transmitted from the jet gases, thus maintaining the highest possible enthalpy. The tungsten liner itself is approximately 87% of theoretical bulk density, and this porosity further increases the resistance to heat flow from the propulsive gases.

One of the unique features of my invention is that it permits a geometric shape to be made out of pure tungsten metal, which has never been accomplished before. Tungsten is a member of a unique family of metals, possessing high room-temperature brittleness with a low hardness. It is extremely difficult to machine this metal and the complete machining of the required nozzle shape from bar stock is practically impossible. Pressed and sintered powder metallurgy techniques also cannot be used because of the complicated die and fixturing required. I have discovered the relatively new advent of the plasma arc as a useful manufacturing tool permits the construction of jet nozzles out of these high melting point metals, according to my invention.

One object of my invention is to provide a method for making rocket nozzles as monolithic structures of the desired shape, having no segments or seams, and composed of (1) a basic layer of a refractory metal whose melting point is above the temperature (5000° F. to 6500° F.) of rocket jet gases, and (2) is overlaid by a covering layer of refractory material of low thermal diffusivity and conductance, which minimizes the transient and steady-state temperature at the outside surface of the nozzle.

Another object of my invention is to provide a method for making monolithic rocket nozzles which comprise a basic layer of metal (e.g., tungsten), and successive overlaying layers of a mixture consisting of a progressively decreasing percentage of said metal with a correspondingly increasing percentage of a refractive material of low thermal diffusivity and conductance (e.g., zirconia), so that the outermost layer of the nozzle consists of pure zirconia.

Another object of my invention is to provide a method of making monolithic rocket nozzles in which the brittle refractory component materials are locked in place by an encapsuling steel sleeve or shell.

A further object of my invention is to provide as articles of manufacture rocket nozzles of monolithic construction consisting of a plurality of layers of a mixture of a metal and a refractory material in which the metal varies from 100 percent (with the refractory material from zero), in the innermost layer, to zero percent metal (with 100 percent refractory material) in the outermost layer; said nozzles being incapsuled in a steel shell which locks the brittle component materials in place.

With these and other objects in view of which may be incident to my improvements, my invention consists in the combination and arrangements of elements shown in the accompanying drawing in which FIG. 1 is a longitudinal section of a rocket nozzle made according to my invention, and FIG. 2 is a cross-section on the line 2—2 of FIG. 1.

In the drawing, the reference numeral 1 denotes an innermost layer or liner of pure tungsten, which is immediately overlaid by a layer 2, consisting of a mixture of about 80% tungsten and 20% zirconia. Layer 2 is in turn overlaid by a layer 3, consisting of a mixture of about 20% tungsten and 80% zirconia. Finally, overlying layer 3 is an outermost layer 4 of pure zirconia, which fills all the space between layer 3 and steel shell 5, and serves to thermally insulate said shell from heat radiating from the combustion chamber in liner 1. Shell 5 comprises a cylindrical sleeve 6 of stainless steel, having at its open end an internal flange 7, which fits snugly over an outwardly-extending, integral flange 8 on liner 1.

The inner end of sleeve 6 has an outwardly-extended flange 9, which is clamped, by a plurality of adjustable screw bolts 10, to a mating flange 11 of a stainless steel end cap 12, so that when sleeve 6 and cap 12 are assembled, as shown in FIG. 1, they form an outer shell which closely contacts the entire outer surface of layer 4, and incapsulates the brittle, refractory elements 2, 3 and 4 and securely locks them in place.

Before assembling, the outer surface of the nozzle is finished ground to fit the inner surfaces of sleeve 6 and cap 12.

Liner 1 and cap 12 are each provided with a plurality of holes for the reception of a liquid fuel injector 13 and an oxidizer injector 14.

Liner 1 and overlying layers 2, 3 and 4 are formed by first plasma spraying pure tungsten powder onto a removable metal mandrel which is then removed. Due to the difference in expansion of tungsten and zirconia gradated layers of composites are then sprayed over the tungsten. Layer 2 of 20% zirconia and 80% tungsten is the first insulation layer applied. This layer is then followed up by additional layers 3 and 4 of progressively less tungsten content, until the final layer 4 is of pure zirconia.

The mandrel on which the tungsten is plasma sprayed is made of a soft metal, such as brass or aluminum, which is readily dissolved in either an acid (for brass) or a strong alkali (for aluminum). The mandrel is machined precisely to the desired contour, and is then mounted in a suitable chuck or jaw, and rotated at a uniform speed depending on the following factors:

(a) Maximum diameter of mandrel.
(b) Rate of powder deposit.
(c) Type of coatings to be applied.
(d) Desired density.

I have found that a mandrel surface speed (at its greatest diameter) of 35" to 40"/min., and at a deposition rate of approximately 4 lbs. of tungsten powder per hour, produce a tungsten coating of approximately 87% density. A greater surface speed will result in a lower density coating.

The tungsten powder is heated to a plastic state in the plasma jet and as the particles are directed on to the previously roughened surface of the mandrel, the individual metal particles strike the mandrel with a relatively high velocity. There is a slight increase of temperature at the surface of the particles, due to the conversion of their velocity energy to heat upon impact. This rise in temperature causes some local melting on the part of the mandrel, and some fusion bonding between the deposited particles and the mandrel takes place. Thus, the bond between the coating and mandrel is both mechanical and fusion. The mechanical bond results from the plastic particles interlocking in the roughened surface of the mandrel.

This relative tight bond causes no difficulty since the mandrel is then removed by dissolving it out with a suitable mandrel solvent, such as an acid or strong alkali, depending upon whether the mandrel is made of either brass or aluminum, respectively.

The remaining oxide-metal and pure oxide (zirconia) coatings are applied essentially in the same manner. Intentional roughening of the surface of the deposited coat is not required, prior to applying the next metal-oxide or pure oxide coat. Due to the nature of the coating process, as described above, whereby the particles are only plastic but not fused, the coat (as deposited) is sufficiently rough to constitute a satisfactory mechanical bond for the remaining coats.

I have found that no change in the depositing variables was necessary up to the final pure zirconia coat. The oxide and metal particles are both ejected from the plasma jet in a plastic state, although due to the higher fusion or melting point of tungsten, the oxide particles are in a state of "more plasticity." However, the zirconia possesses a heat capacity of approximately four times that of tungsten, which property tends to off-set its lower melting point.

For the final pure zirconia coat, I found it necessary to adjust the powder material flow so that approximately 1-2 pounds of oxide was deposited per hour.

The complete nozzle is then finished ground to fit the interior surface of the two-piece stainless steel shell 5. Holes are put into the nozzle chamber for the liquid fuel and oxidizer injectors 13 and 14.

FIG. 1 clearly shows the "encapsulating" feature, whereby the brittle refractory materials of tungsten and zirconia are securely locked in place by the overall steel shell.

The number and shape of the coating composition of thermal insulation of layers 2, 3 and 4 vary in accordance with the combustion chamber temperature and outside envelope configuration. In most instances, two different proportions of tungsten and stabilized zirconia, as in layers 2 and 3, between the pure tungsten liner 1 and outer pure zirconia layer 4 are found adequate. The purpose of these inter-layers 2 and 3 is to avoid marked thermal expansions between the tungsten and stabilized zirconia which differ by considerable magnitude. Grading of the composition of the coating layers reduces the shear stresses at the interfaces of any two layers, caused by the different thermal expansions of these materials.

The tungsten and stabilized zirconia generally consist of powdered grain particles of $-100$ to $+325$ mesh size. A mixture, consisting of approximately 75% tungsten and 25% zirconia by volume, is fed into a plasma spray gun, such as that disclosed in Pat. 2,922,869. Due to the difference in the mass of the two powders, some of the lighter zirconia particles are blown aside in the plasma depositing process and are not recovered. I have found that with this mixture ratio a coating will be deposited consisting of approximately 80% tungsten and 20% zirconia. This particular coating 2 is the one that is applied directly on the pure tungsten liner 1.

The next coating 3 will consist of a deposited coat of approximately 80% stabilized zirconia and 20% tungsten. The mixture, however, as fed into the plasma gun will run about 5% richer in the lighter zirconia material. This coat is then followed up with a final coating of pure stabilized zirconia.

It is to be particularly noted that the particles of tungsten and zirconia are not melted during the coating process, but are heated to a plastic state, hence there is no fusion or alloying of the metal (tungsten) and zirconia. The coatings (except the innermost coating in contact with the mandrel) are bonded together by mechanical and metallurgical bonds, owing to the plastic state of the deposited particles during the coating process. The bond between the innermost coating and the mandrel differs somewhat from the bonds between the other coating owing to local melting of the mandrel metal and some fusion bonding between the particles of the mandrel and the tungsten coating.

The density of the tungsten liner coating (87%) is the natural end result of the following factors in applicant's coating process:

(a) Particle size of the tungsten powder $-100$ to 125 mesh size.
(b) Temperature of particles at time of deposit, i.e., near, but below the melting point of tungsten.
(c) The rate of deposit of the particles, i.e., mandrel rotation speed, so that (at its greatest diameter) its surface speed is 35" to 40" per minute.
(d) The metal particles striking the mandrel with a relatively high velocity as compared to the surface speed of the mandrel.

While I use a plasma spray gun and direct its flame over the surface to be coated, and I inject the particles of the coating materials into the flame, as disclosed in Pat. 3,922,869, I do not follow the teaching of that patent, insofar as concerns the melting of the deposited particles during the coating process. On the contrary, I adjust the electric arc and rate of gas flow, so as to obtain a maximum particle temperature below the melting points of the deposited particles, whereby the melting of the particles is avoided. Because of the much lower melting point of the mandrel metal, there is some local melting of the mandrel during the coating process, which causes some local fusion bonding of the contacting deposited particles with the mandrel metal. However, such fusion bonds are removed by the acid or alkali used to dissolve the mandrel.

While I have cited tungsten and zirconia as examples of the materials used in forming my improved rocket nozzle, it is to be understood that these particular materials are cited by way of example, and not as specific limitations of the scope of my invention, since other similar materials, such as those pertaining to Group IV of the Periodic Table of chemical elements, may be used in lieu of tungsten and zirconia.

It is also to be understood, that the proportions given for the materials forming the layers overlying the liner, are those preferred to attain the best results, but that these proportions may be varied somewhat to produce layers having different degress of porosity and heat resistance. The preferred proportions given in the above example have been found to produce the most desirable degree of porosity and the highest heat resistance in the finished liner.

While I have shown and described the preferred embodiment of my invention, I desire it to be understood that the invention is not limited to the construcion details disclosed by way of illustration, as these may be changed and modified by those skilled in the art without departing from the spirit of my invention nor exceeding the scope of the appended claims.

I claim:

1. A monolithic chamber, throat and nozzle assembly for a rocket motor comprising, a monolithic liner of substantially pure tungsten for said assembly, an insulating layer formed of a mixture of tungsten and zirconia bonded to and surrounding said liner.

2. A monolthic jet nozzle for rocket motors, as claimed in claim 1, including an adjustable metal shell contacting substantially the entire outer surface of said chamber, throat and nozzle assembly and securely locking the components of said rocket motor in place.

References Cited

UNITED STATES PATENTS

| | | | |
|---|---|---|---|
| 3,129,560 | 4/1964 | Prosen | 239—265.15 X |
| 3,189,477 | 6/1965 | Shaffer | 239—265.15 X |

SAMUEL F. COLEMAN, Primary Examiner

H. S. LANE, Assistant Examiner